UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

METHOD OF DESULPHURIZING OIL.

1,423,712.  Specification of Letters Patent.  Patented July 25, 1922.

No Drawing.   Application filed July 17, 1920. Serial No. 397,056.

*To all whom it may concern:*

Be it known that I, JOHN COLLINS CLANCY, a subject of the King of Great Britain, residing at Providence, in the county of Providence and State of Rhode Island, have invented certain new and useful Improvements in Methods of Desulphurizing Oil, of which the following is a specification.

This invention relates to the purification of mineral oils and especially concerns a process whereby such oils, even when they bear a high sulfur content, may be substantially completely desulfurized.

One of the principal objects of my invention is, hence, to accomplish this desulfurization rapidly and economically; while another object is to not merely eliminate sulfur from the oil,—desirable as such elimination is,—but, further to recover the sulfur in useful form and in combination with certain other elements.

It frequently happens that mineral oil, especially those produced in Mexico and in parts of Texas, have such a high content of sulfur as to render commercially impracticable their cracking, to produce gasoline and the like therefrom. When such oils are distilled, the distillate contains so much sulfur as to seriously interfere with their commercial catalytic conversion into, for example, gasoline.

As a result, they are commonly sold simply as crude products.

The percentage of sulfur in these oils frequently is as high as 5% by weight; and when it is attempted to produce gasoline from such sulfur bearing material, some of the sulfur is very apt to find its way into the final product.

Gasoline containing sulfur injures the iron or steel walls of internal combustion engines in which it is used; by reason of the formation of iron sulfid.

I have discovered that it is practicable to quite completely remove sulfur from mineral oils in which the same is present to even the extent stated.

The reagent preferably employed is ammonia vapor.

For example, if a body of mineral oil, or a distillate thereof, such as kerosene, be placed in a still and heated to, for example, 250° C.,—and a current of ammonia gas is then directed into the bottom of the mass of oil, so that it may bubble up therethrough,—the vapors passing off from the still will comprise a sulfur-ammonium compound, the excess ammonia gas, and hydro-carbon vapors.

This mixture of vapors is then directed into a body of preferably boiling water; with the result that a solution of ammonium sulfid will be formed,—while the oil will, of course, collect upon the top of the water.

The water containing the sulfid, together with ammonia in solution therein, may be readily separated from the oil and the latter will then be found to contain but a small percentage of sulfur. When the operation is properly conducted, the percentage of sulfur in the finished oil may be as low as .25 of one per cent.

The purification of the oil may be improved by injecting steam into the vapor leaving, or about to leave, the still; and either collecting in water the so formed mixture of vapors; or otherwise condensing the steam to water,—with the result, in either case, that again a solution of ammonium sulfid is produced.

By using steam in the manner aforesaid, it is possible to still further reduce the content of sulfur remaining in the finished oil.

The notable success of the operation appears largely to reside in the fact that all of the substances involved in the reaction are in the gaseous phase. Under these conditions, the steam will take up the sulfur from the hydro-carbon vapors quite completely; so that the finished oil will be found to be nearly free from the sulfur.

Even where ammonia gas is used without the admixture of steam, the vaporous hydrocarbons passing off from the mass of oil, seem to react further with the excess of ammonia vapor; so that in this case the reaction is effected in part within the mass of liquid oil and in part in the body of vapor passing away therefrom.

The oil will absorb some of the ammonia; but this may be separated therefrom by washing the finished oil with acidulated water. I prefer to acidulate this washwater with sulfuric acid, in which case ammonium sulfate is formed, and this will be found in the water, after the latter has been separated from the oil.

In certain of the appended claims, wherein it is specified that the oil is treated with ammonia vapor and water, it will be understood, in view of the foregoing, that the said water may be in either liquid or vaporous condition.

Having thus described my invention, what I claim is:

1. A process of desulphurizing mineral oil, which comprises treating a heated mass of said oil with ammonia vapor and steam.

2. A process of desulphurizing mineral oil, which comprises treating a mass of said oil with ammonia vapor and steam, and condensing the reaction residues.

3. A process of desulphurizing mineral oil, which comprises effecting a reaction involving ammonia, water and the sulfur present in said oil, while said oil is in vaporous condition.

4. The process of desulphurizing mineral oil, which comprises, reacting upon said oil with ammonia vapor at approximately 250° C. to form an ammonia-sulfur-compound, and separating the compound thus formed from said oil.

5. In a process for desulphurizing mineral oil the step which comprises reacting upon said oil with ammonia vapor at approximately 250° C. to form an ammonia-sulfur compound.

6. The process of desulphurizing mineral oil, which comprises, passing ammonia vapor through the oil at a temperature below the decomposition point of ammonia to remove sulfur therefrom in the form of an ammonia-sulfur compound, and treating the material thus obtained to form a solution of the ammonia-sulfur compounds.

7. The process of desulphurizing mineral oil, which comprises, treating the oil with ammonia at a temperature of approximately 250° C., and reacting upon the gaseous products thus formed to separate from the oil the ammonia-sulfur compounds formed as a result of the treatment.

8. The process of desulphurizing mineral oil which comprises treating a heated mass of said oil with ammonia vapor and steam at a temperature sufficient to promote the reaction without effecting decomposition of the ammonia.

In testimony whereof I have affixed my signature, in the presence of two witnesses.

JOHN COLLINS CLANCY.

Witnesses:
MILDRED H. ANDREWS,
HOWARD C. RIPLEY.